United States Patent
Gilliam et al.

(10) Patent No.: US 7,711,946 B2
(45) Date of Patent: May 4, 2010

(54) METHOD AND APPARATUS FOR USING FILESYSTEM OPERATIONS TO INITIATE DEVICE NAMING

(75) Inventors: Jerry A. Gilliam, Sunnyvale, CA (US);
Yonghong Lai, San Jose, CA (US);
Shudong Zhou, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 940 days.

(21) Appl. No.: 11/500,804

(22) Filed: Aug. 7, 2006

(65) Prior Publication Data

US 2008/0034195 A1  Feb. 7, 2008

(51) Int. Cl.
*G06F 9/24* (2006.01)
(52) U.S. Cl. .......................................... 713/100; 713/1
(58) Field of Classification Search .................. 713/1, 713/2, 100
See application file for complete search history.

(56) References Cited

U.S. PATENT DOCUMENTS

| | | | |
|---|---|---|---|
| 6,041,364 A | * | 3/2000 | Lortz et al. ................. 719/321 |
| 6,263,378 B1 | * | 7/2001 | Rudoff et al. ............... 719/327 |
| 6,351,751 B1 | * | 2/2002 | Traversat et al. ......... 707/103 Y |
| 2007/0136721 A1 | * | 6/2007 | Dunshea et al. ............. 717/174 |

* cited by examiner

*Primary Examiner*—Mark Connolly
*Assistant Examiner*—Paul B Yanchus, III
(74) *Attorney, Agent, or Firm*—Park, Vaughan & Fleming LLP

(57) ABSTRACT

One embodiment of the present invention provides a system that uses filesystem operations to initiate device naming and/or device discovery. The system operates by receiving a command to boot a computer system. In response to the command, the system loads a portion of a filesystem hierarchy that includes a device namespace into a memory of the computer system, wherein the portion of the filesystem hierarchy contains at least one entity which represents a device coupled to the computer system. The system can then perform a read-directory operation on the portion of the filesystem hierarchy or a lookup operation of a specific well-known device or directory to obtain a list of filesystem entities that correspond to devices attached to the computer system.

20 Claims, 3 Drawing Sheets

Device Name Resolution with Devname

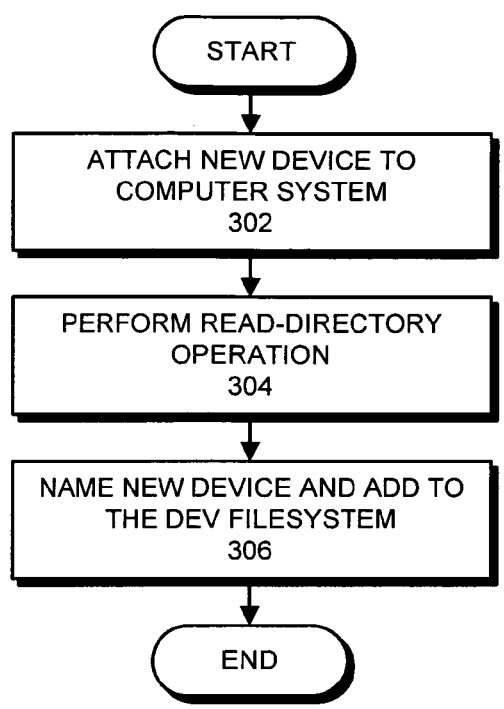
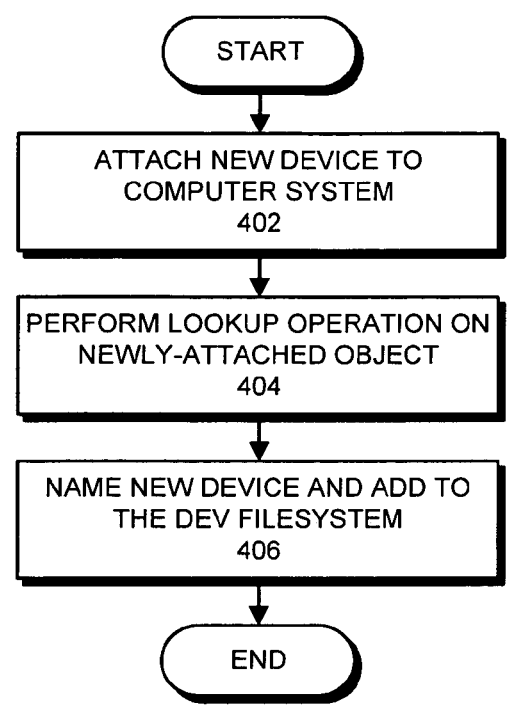
FIG. 3
FIG. 4

METHOD AND APPARATUS FOR USING FILESYSTEM OPERATIONS TO INITIATE DEVICE NAMING

RELATED APPLICATION

The subject matter of this application is related to the subject matter in a co-pending non-provisional application by Yonghong Lai, Shudong Zhou, and David A. Butterfield, and filed on the same day as the instant application entitled, "METHOD AND APPARATUS FOR USING A DIRECTORY SERVICE TO FACILITATE CENTRALIZED DEVICE NAMING," having Ser. No. 11/500,795, and filing date Aug. 7, 2006.

BACKGROUND

1. Field of the Invention

The present invention relates to operating systems for computers. More specifically, the present invention relates to a method and an apparatus for using filesystem operations to initiate device name generation for newly discovered but as of yet unnamed devices.

2. Related Art

One problem that has plagued computer systems that use the Solaris™ operating system is the need to perform a "reconfiguration boot" when new devices are attached to the computer system. In a Solaris™ environment, when a new device is attached to a computer system, the computer system needs to perform the administration procedure known as a "reconfiguration boot" in order to recognize, and generate a name for, a new physical device attached to the computer system.

Currently, if a user attaches a new physical device to the computer system, the user must perform the configuration reboot to use the physical device. This can be problematic, especially for servers that need to be in an operational state as much as possible. Furthermore, if the user adds a new physical device to the computer system while the computer system is in a powered-off state and neglects to perform a reconfiguration boot, the user must often then perform a second boot as a reconfiguration boot in order to generate a name for the newly-attached device.

One method for dealing with the problem of adding devices while the computer system is turned off is to perform a reconfiguration boot every time the computer system is booted. However, this can be problematic because the reconfiguration boot can take a long time to complete in comparison to a normal boot. Moreover, as the number of physical devices attached to the computer system increases, the amount of time required for a reconfiguration boot also increases. For servers that are attached to a very large number of physical devices, such as a large grouping of disk drives in a large storage array, it is not unusual to have reconfiguration boots lasting multiple minutes. This can be troublesome for servers because it is desirable to bring servers back online as quickly as possible.

Hence, what is needed is a method and an apparatus for adding new physical devices to computer systems without the problems listed above.

SUMMARY

One embodiment of the present invention provides a system that uses filesystem operations to initiate device name generation for newly discovered but as of yet unnamed devices. The system operates by receiving a command to boot a computer system. In response to the command, the system loads a portion of a filesystem hierarchy that includes a device namespace into a memory of the computer system, wherein the portion of the filesystem hierarchy includes at least one entity which represents a device coupled to the computer system. The system can then perform a read-directory operation on the portion of the filesystem hierarchy or a lookup operation of a specific well-known device or directory to obtain a list of filesystem entities that correspond to devices attached to the computer system.

In a variation on this embodiment, performing the read-directory operation further involves determining if the entity representing the device coupled to the computer system is present within the portion of the filesystem hierarchy. If not, the system creates the entity in the portion of the filesystem hierarchy.

In a variation on this embodiment, the system receives a lookup operation at an operating system running on the computer system, wherein the lookup operation includes an entity name as an argument, and wherein the entity name is associated with a second device which is coupled to the computer system. The system then performs the lookup operation on the portion of the filesystem hierarchy with the entity name to obtain information associated with the second device.

In a further variation, performing the lookup operation further involves determining if the entity associated with the entity name is present in the portion of the filesystem hierarchy. If not, the system creates the entity in the portion of the filesystem hierarchy.

In a variation on this embodiment, the read-directory operation is performed to facilitate the discovery of a second device that is coupled to the computer system, but is not represented by an entity in the filesystem.

In a further variation, the read-directory operation is performed in the background so that the read-directory operation is transparent to a user who is using the computer system.

In a variation on this embodiment, the read-directory operation is performed if the computer system detects the presence of a new device added to the computer system.

In a variation on this embodiment, the portion of the filesystem hierarchy includes a copy of an operating system device namespace.

BRIEF DESCRIPTION OF THE FIGURES

FIG. 3 presents a flowchart illustrating the process of dynamically naming a new device via a read-directory operation in accordance with an embodiment of the present invention.

FIG. 4 presents a flowchart illustrating the process of dynamically naming a new device via a lookup operation in accordance with an embodiment of the present invention.

DETAILED DESCRIPTION

Figure 1:
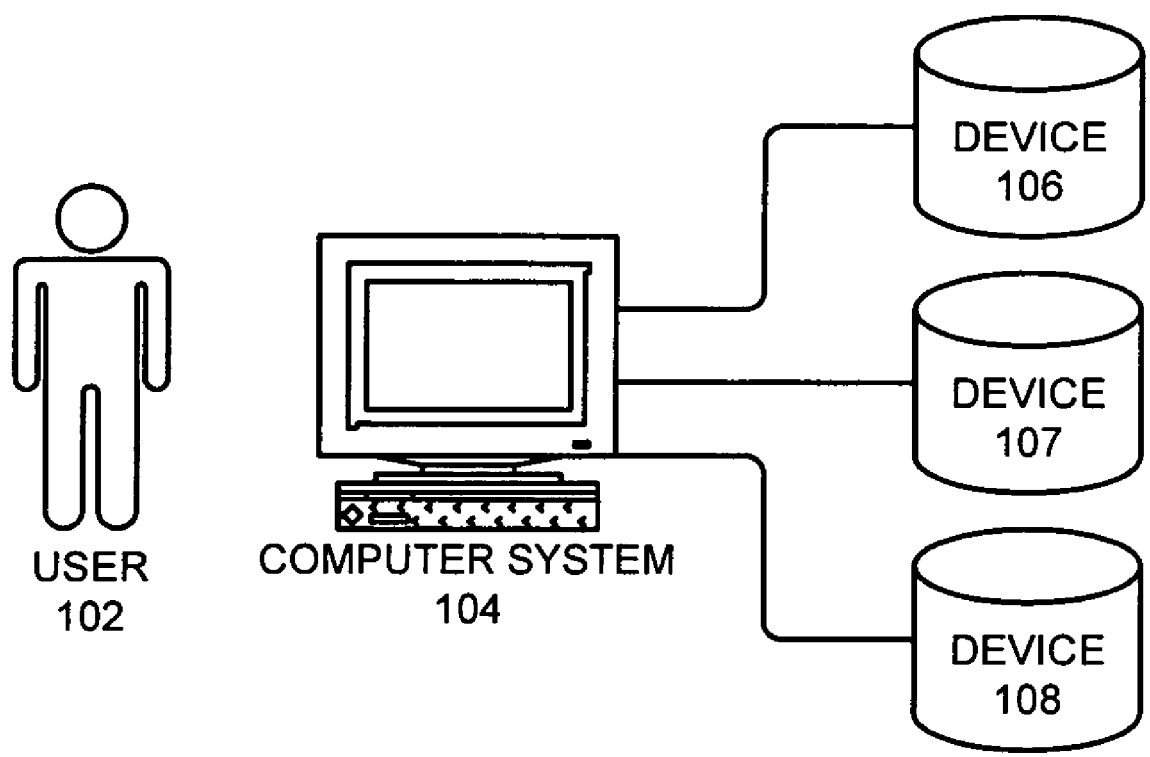
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

In operating systems, such as Solaris™ devices are typically represented in two namespaces: /dev and /devices. The /devices namespace represents the physical path to a hardware device, a pseudo device, or a bus nexus device. It reflects the kernel device tree and is managed by the devfs filesystem. However, the /dev namespace includes logical device names used by applications. The names are either symbolic links to the physical path names under /devices or, in rare cases, device special files created via the mknod(1M) command or the mknod(2) system call. Most of the /dev names are automatically generated by devfsadmd(1M) in response to physical device configuration events. These naming rules are then delivered by driver developers through link generator modules for devfsadm and entries in /etc/devlink.tab. Note that it is also possible for system administrators and applications to create device special files and symbolic links directly, bypassing the devfsadm framework. Also note that while the detailed description uses Solaris™ as an example, the present invention is not meant to be limited to the Solaris™ operating system.

The global /dev namespace resides under the system root /dev directory. Some Solaris™ applications, like ftpd, create a chroot'ed environment and export a restricted subset of the system device names into its chroot'ed /dev directory. Solaris™ zones create virtualized Solaris™ instances and provide a subset of the system device names inside the virtualized /dev namespace.

By default, Solaris™ does not update /dev namespace for new devices on a normal boot in order to reduce boot time. If new devices are added while a system is powered down, a user must initiate a reconfiguration boot by explicitly issuing a special boot command, i.e. boot -r, or touch the "/reconfigure" file before the computer system is rebooted, in order to make the new devices visible in /dev. The need for a reconfiguration boot is not common in other operating systems, and the need to perform a reconfiguration boot is often confusing to new Solaris™ users.

One case in particular is perceived as a negative differentiator for Solaris™. If a device is attached to the computer system when the computer system is powered off, Solaris™ typically won't notice such a device on reboot. System administrators must take an additional step, either rebooting -r or running devfsadm(1M) once the computer system is up. Very few, if any, other operating systems require this.

In order to remedy these problems, one embodiment of the present invention implements the "dev filesystem." The dev filesystem provides a uniform interface to logical device names, i.e. /dev files. The primary purpose of the dev filesystem is to intercept lookup calls to /dev files and translate them to calls to /dev subdirectory specific name resolution routines, or the default if no special routine is provided.

The dev filesystem is mountable in a restricted way. As described below, the global instance is mounted onto /dev early when the system is booted. Other mounting operations occur when a subset of the global /dev names are exported into chroot'ed /dev environment. While the global instance is mounted by the kernel, other filesystem mounts are normally initiated in a subsystem program like zoneadm(1M).

The in-memory filesystem states can be persisted across system reboots. In order to persist the changes of some filesystem states, e.g. file permissions, ownerships, ACLs, local backing store(s) are used. By default, the backing store is located at the same directory as the filesystem mount point. An alternate backing store location can be specified through the mount options. To accommodate the volatile nature of some device names, e.g. /dev/pts nodes, the filesystem also allows a /dev subdirectory to choose not to persist anything into the backing store. Such a directory is called a dynamic directory.

The dev filesystem controls all the /dev logical device names, including the ones inside the system root /dev namespace and any existing ones inside the chroot'ed /dev namespace(s). The key here is to mount an instance of the filesystem onto each /dev namespace, while differentiating the mounting of the first filesystem instance, called global instance, from the rest of the filesystem instance(s), called non-global instance(s).

After the global instance is successfully instantiated, one or more dev instance(s) can be mounted by applications like zoneadm(1M), or ftpconfig(1M). These non-global instances can be unmounted anytime, such as when tearing down an anonymous FTP environment or halting a local zone. When such an instance is mounted into local zone, for example zone2, the "mount -p" shows this dev instance as: "/dev -/export/home/zone2/root/dev dev—no".

Unlike the global instance, these instances are instantiated with an empty /dev namespace. Except for the dynamic directories, the chroot'ed /dev namespace only includes a strict subset of the device [re]names in the global /dev namespace. The subset of devices is represented by a list of matching rules, called a profile. The profile is compiled by the system administrator that is configuring the application. Upon successful mounting a dev instance, the mounting application passes a profile down to the file system in the kernel. From then on, the file system is responsible for populating each instance according to the associated device profile. The file system also allows dynamic updating of the device profile.

Populating each non-global instance occurs on-demand within the file system. Initial population happens when the first device in the profile is accessed (i.e. looked up), in which case the /dev [sub]directory is fully populated with all the profiled devices for the [sub]directory if the device is existing in the global instance. New devices may show up later when the corresponding device name is configured into the global instance. Already populated device names may be removed from the directory when it is accessed, and when the file system detects the absence of this device name from the global instance, such as when a hardware device is removed from the system.

Sometimes, a global device may have a different name in the non-global instances. This is handled by the renaming rule in the profile. A renaming rule needs to provide the original device name for a profiled device. Thus, the file system is able to check the existence of the original device name in the global instance and populate the profiled device with the device attributes of the original device.

Some directories include session-oriented device names that are dynamically created when a session is initiated and destroyed when the session is closed. The /dev/pts nodes are examples that are volatile in terms of their lifetime on the system.

The file system treats dynamic directories specially. Normally, this kind of directory is associated with its own special device name resolution routines. The device name creation and destruction are determined through the mechanism implemented in the special routine. Thus, it is up to the mechanism to characterize the device names in a global instance versus non-global instances. They no longer have the subset relationship discussed previously.

Computing Environment

FIG. 1 illustrates a computing environment 100 in accordance with an embodiment of the present invention. Computing environment 100 includes user 102, and computer system 104. Computer system 104 can generally include any type of computer system, including, but not limited to, a computer system based on a microprocessor, a mainframe computer, a digital signal processor, a portable computing device, a personal organizer, a cell phone, a device controller, or a computational engine within an appliance. In one embodiment of the present invention, computer system 104 is running the Solaris™ operating system with the dev file system.

Device 106, device 107, and device 108 are coupled to computing system 104. Devices 106-108 can include any type device that can be coupled to a computer system. This includes, but is not limited to, magnetic, optical, or magneto-optical storage devices, as well as storage devices based on flash memory and/or battery-backed up memory, printers, network interface cards, input devices, display devices, audio devices, and video devices.

Device Name Resolution

Figure 2:
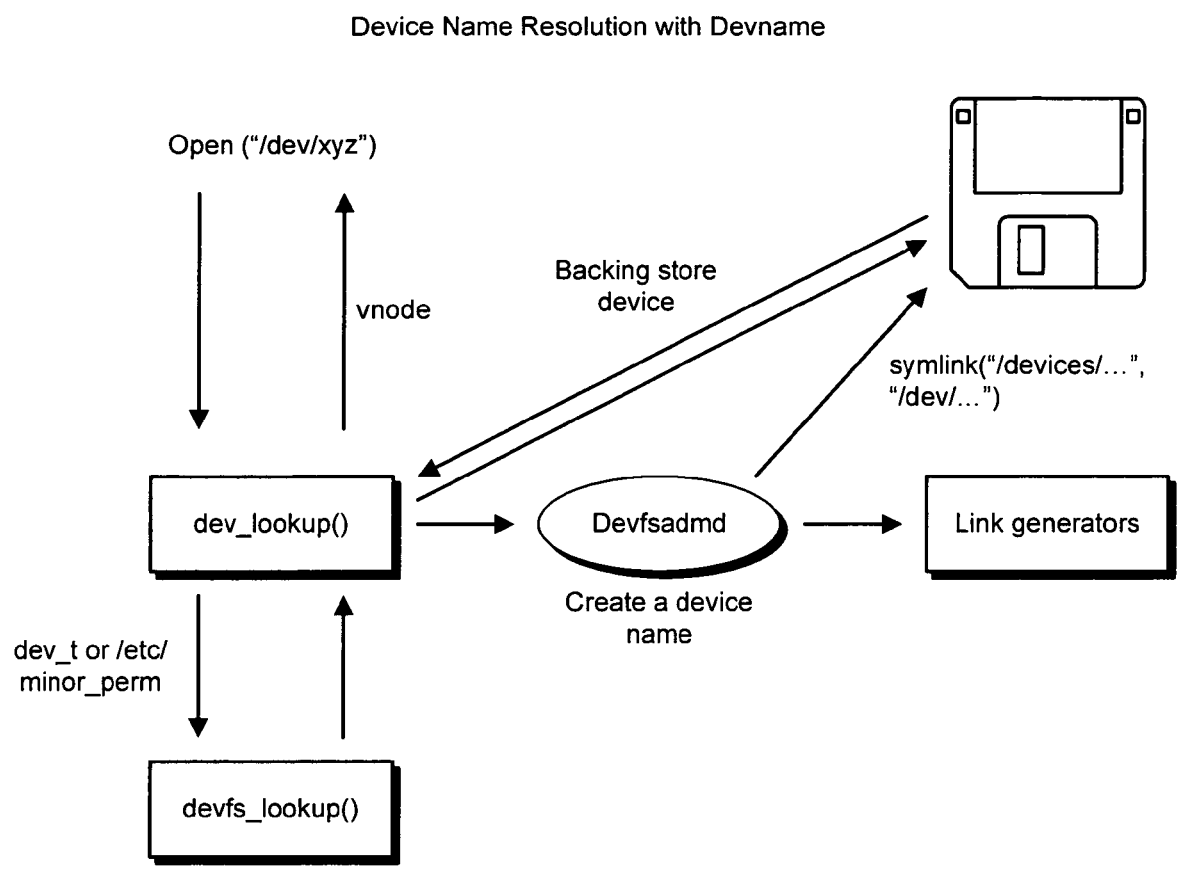
FIG. 2 illustrates a device name resolution process in accordance with an embodiment of the present invention.

FIG. 2 illustrates a device name-resolution process in accordance with an embodiment of the present invention.

The dev file system provides a dynamic environment that can be deployed to solve most of the problems listed previously. The key is the middle-man position of the file system that intercepts all the /dev device name lookups, i.e. vop_lookup( ), which is searching the /dev or a /dev subdirectory for a path-name component matching the supplied relative path-name string. The dev file system allows a customized name resolution mechanism to be registered for individual subdirectory and applies the customized name resolution mechanism to resolve all the path-names inside the same subdirectory.

FIG. 2 illustrates how the dev file system vop_lookup( ) works to handle co-existing of the device name resolution mechanism varieties. Note that the Devfsadm mechanism exists today and continues to work with the new architecture of the present invention. Additions are the DBNR agents, which provides the directory specific customized name resolution, Solaris™ name services, which provides the centralized storage of device name binding scheme, and in-kernel devfs file system interaction, which extends the dynamic kernel device tree configuration feature to the /dev layer.

The dev_lookup( ) is the entry point that resolves a /dev path-name according to its residing directory. Like the rest of the other vfs based file systems, searching a path-name component string starts with the top of the file system, i.e. the /dev directory, continues to the next layer of the /dev subdirectories, and so on. By default, resolved /dev names are also cached in the memory organized similar to the on-disk file system hierarchical structure. Unlike other vfs file system, dev_lookup( ) is implemented to be smarter than just searching the directory cache and looking up the backing store for the path-name. The dev file system keeps an internal switch table, which associates a /dev subdirectory to a vectored routine that implements its individual name resolution scheme. If available, the vectored name resolution scheme is applied to resolve all the path-names inside the subdirectory.

To gain device [re]naming flexibilities, a Solaris™ subsystem can deliver a customized name resolution routine into the dev file system switch table. The Directory Based Name Resolution, abbreviated as DBNR, dispatching works well when the /dev subdirectory is a collection of all the device names that represent the same type of devices which follow the same device naming scenario. Existing /dev namespaces exhibit such a tendency, which include a group of subdirectories with each representing a different type of device. For example, /dev/rmt represents all the tape devices on the system. It is worth mentioning that current /dev namespace do not have subdirectories for all the Solaris™ supported device classes. In practice, a project normally creates a /dev subdirectory to host all the devices that are interested to the subsystem the project is supporting.

Implicit Device Reconfiguration

In one embodiment of the present invention, the dev filesystem provides a unique opportunity to improve the configuring new device names experience. The filesystem can invoke devfsadmd(1M) to resolve the lookup operation of a non-existent device name or to complete the readdir of a /dev directory. Thus, names for new devices can be configured without the need for a special reconfiguration boot.

In practice, all /dev names required to complete the preliminary phase of boot, mounting root, usr and swap for example, and pseudo devices such as /dev/null, are set up and configured as part of the install process. System daemons, such as vold(1M) and picld(1M), explore what's available on a system as they start up, and some of this involves searching for a variety of devices, some of which do not and may never exist on a given system. For example, some platforms provide memory controller devices in /dev/mc, referred to by picld (1M). Another example of an attempt to discover a non-existent device is /dev/NULL by dtlogin. In general it is obvious that real-world software is very cavalier with respect to /dev, and that without a mechanism to avoid it, an implicit reconfig would be performed quite early during each boot.

For this purpose, a cache of unsuccessfully looked up device names, referred to as negative cache, during system boot and after an implicit reconfig is accumulated and persisted. This gives the /dev filesystem a working set of device names for which implicit reconfigure need not be initiated.

Persisted dev File System Negative Cache

In one embodiment of the present invention, the negative cache is persisted in /etc/devices/devname_cache. This is the same directory used for the devid, mdi and devinfo snapshot caches. By persisting the data, the negative cache entries recorded during the most recent reconfiguration boot are available to subsequent boots.

The persisted data can be recreated if the persistent store is removed or corrupt because the persistent store is updated for non-existent devices accessed during both reconfiguration and non-reconfiguration boots. No administration of the persisted store is necessary, and in practice, it is expected that this data should rarely, if ever, need to be updated once established.

Since the negative cache initial state is not required in order to mount root, the persistent store may be read at the time the dev file system is mounted. This implies that the persistent store file does not need to be included in the GRUB boot archive.

The effect of an entry in the negative cache is only to avoid triggering implicit reconfiguration for lookup of a node or directory not otherwise discovered. A name is added to the negative cache when a implicit reconfiguration operation is attempted and the device name is not generated. A name in the negative cache is removed if that device name is created via, for example, making a directory, a device node, or a symbolic link.

In practice, after a couple of attempts at implicit reconfiguration, a given system's negative cache typically reaches steady state and seldom changes.

To explain why the negative cache does not need explicit management, the following scenarios are presented: Consider the case that some driver has not yet been installed on computer system 100, and the user 102 runs something to access it, for example, 1s −1/dev/xyz. The lookup would invoke reconfig, xyz would not be discovered, and would be entered in the negative cache. Then, the user 102 installs the package with the necessary driver, or perhaps gets a corrected version of the driver supporting the new device. The install/update process should invoke add_drv, update_drv or devfsadm, and either install a new/updated driver.conf file, a devfsadm link generator module or create the name directly via mkdir, link or mknod, any of which would remove the name from the negative cache as part of the create operation.

The public means of correcting an invalid entry in the negative cache for a name created by a link generator would be simply to invoke devfsadm. For example, attempting to lookup a newly attached but powered-off disk could put that device name (if one guessed correctly) in the negative cache. After powering the device on, the user 102 should invoke devfsadm, which is our documented procedure today.

For anything not covered by a link generator, it would be a bug that the name had not already been created directly. Further, the only meaning attached to an entry in the negative cache would be to not attempt implicit reconfiguration; but implicit reconfiguration, invoking devfsadm, cannot create something not covered by a link generator anyway. So, the way to correct a missing /dev/xyz name not created by a link generator and not created by the xyz install process due to a bug would be a manual operation (mkdir, link, mknod).

There is one other mechanism that an install procedure could use which is /etc/devlink.tab. But that is covered by devfsadm, so for the purposes of the present invention, that is equivalent to the link generator mechanism.

Dynamically Naming a New Device

FIG. 3 presents a flowchart illustrating the process of dynamically naming a new device via a read-directory operation in accordance with an embodiment of the present invention. The system starts when user 102 attaches a new physical device, such as device 108, to computer system 104 (step 302). When user 102 attempts to perform an action on computer system 104 that accesses device 108, such as performing a format operation, computer system 104 performs a read-directory operation as described previously (step 304). Since device 108 has just been coupled to computer system 104, there would typically not be an entry for device 108 in computer system 104's devfs filesystem. Upon finding device 108, the system invokes a device naming mechanism to name device 108, and then adds device 108 to the devfs filesystem (step 306).

Note that, as previously described, the dynamic reconfiguration of new devices can occur when the system boots, when the detection of a new device attached to computer system 104 occurs, when a read-directory operation occurs, or when an operation occurs that invokes a named device that does not exist in the devfs filesystem.

FIG. 4 presents a flowchart illustrating the process of dynamically naming a new device via a lookup operation in accordance with an embodiment of the present invention. The system starts when user 102 attaches a new physical device, such as device 107, to computer system 104 (step 402). When user 102 attempts to perform an action on computer system 104 that accesses device 107, computer system 104 performs a lookup operation as described previously (step 404). Since device 107 has just been coupled to computer system 104, there would typically not be an entry for device 107 in computer system 104's devfs filesystem. Upon finding device 107, the system invokes a device naming mechanism to name device 107, and then adds device 107 to the devfs filesystem (step 406).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using filesystem operations to initiate device name generation for newly discovered but as of yet unnamed devices, the method comprising:
   receiving a command to boot a computer system;
   in response to the command, loading a portion of a filesystem hierarchy that includes a device namespace into a memory of the computer system, wherein the portion of the filesystem hierarchy contains at least one entity which represents a device coupled to the computer system, wherein the portion of the filesystem hierarchy serves as a device tree;
   intercepting a device lookup call at the filesystem; and
   performing a device lookup by performing a read-directory operation on the portion of the filesystem hierarchy to obtain a list of filesystem entities that correspond to devices attached to the computer system, wherein the filesystem performs the device lookup.

2. The method of claim 1, wherein performing the read-directory operation further involves:
   determining if the entity representing the device coupled to the computer system is present in the portion of the filesystem hierarchy; and
   if not, creating the entity in the portion of the filesystem hierarchy.

3. The method of claim 1, further comprising:
   receiving a lookup operation at an operating system running on the computer system, wherein the lookup operation includes an entity name as an argument, and wherein the entity name is associated with a second device which is coupled to the computer system; and
   performing the lookup operation on the portion of the filesystem hierarchy with the entity name to obtain information associated with the second device.

4. The method of claim 3, wherein performing the lookup operation further involves:
   determining if the entity associated with the entity name is present in the portion of the filesystem hierarchy; and
   if not, creating the entity in the portion of the filesystem hierarchy.

5. The method of claim 1, wherein the read-directory operation is performed to facilitate the discovery of a second device that is coupled to the computer system, but is not represented by an entity in the filesystem.

6. The method of claim 5, wherein the read-directory operation is performed in the background so that the read-directory operation is transparent to a user who is using the computer system.

7. The method of claim 1, wherein the read-directory operation is performed if the computer system detects the presence of a new device added to the computer system.

8. The method of claim 1, wherein the portion of the filesystem hierarchy includes a copy of an operating system device namespace.

9. A computer-readable storage medium storing instructions that when executed by a computer cause the computer to perform a method for using filesystem operations to initiate device name generation for newly discovered but as of yet unnamed devices, the method comprising:
   receiving a command to boot a computer system;
   in response to the command, loading a portion of a filesystem hierarchy that includes a device namespace into a memory of the computer system, wherein the portion of the filesystem hierarchy contains at least one entity which represents a device coupled to the computer system, wherein the portion of the filesystem hierarchy serves as a device tree;
   intercepting a device lookup call at the file system; and
   performing a device lookup by performing a read-directory operation on the portion of the filesystem hierarchy to obtain a list of filesystem entities that correspond to devices attached to the computer system, wherein the filesystem performs the device lookup.

10. The computer-readable storage medium of claim 9, wherein performing the read-directory operation further involves:
    determining if the entity representing the device coupled to the computer system is present in the portion of the filesystem hierarchy; and
    if not, creating the entity in the portion of the filesystem hierarchy.

11. The computer-readable storage medium of claim 9, wherein the method further comprises:
    receiving a lookup operation at an operating system running on the computer system, wherein the lookup operation includes an entity name as an argument, and wherein the entity name is associated with a second device which is coupled to the computer system; and
    performing the lookup operation on the portion of the filesystem hierarchy with the entity name to obtain information associated with the second device.

12. The computer-readable storage medium of claim 11, wherein performing the lookup operation further involves:
    determining if the entity associated with the entity name is present in the portion of the filesystem hierarchy; and
    if not, creating the entity in the portion of the filesystem hierarchy.

13. The computer-readable storage medium of claim 9, wherein the read-directory operation is performed to facilitate the discovery of a second device that is coupled to the computer system, but is not represented by an entity in the filesystem.

14. The computer-readable storage medium of claim 13, wherein the read-directory operation is performed in the background so that the read-directory operation is transparent to a user who is using the computer system.

15. The computer-readable storage medium of claim 9, wherein the read-directory operation is performed if the computer system detects the presence of a new device added to the computer system.

16. The computer-readable storage medium of claim 9, wherein the portion of the filesystem hierarchy includes a copy of an operating system device namespace.

17. An apparatus configured to use filesystem operations to initiate device name generation for newly discovered but as of yet unnamed devices, comprising:
    a receiving mechanism configured to receive a command to boot a computer system;
    a loading mechanism configured to load a portion of a filesystem hierarchy that includes a device namespace into a memory of the computer system, wherein the portion of the filesystem hierarchy contains at least one entity which represents a device coupled to the computer system, wherein the portion of the filesystem hierarchy serves as a device tree;
    an interception mechanism configured to intercept a device lookup call at the filesystem; and
    a read-directory mechanism configured to perform a device lookup by performing a read-directory operation on the portion of the filesystem hierarchy to obtain a list of filesystem entities that correspond to devices attached to the computer system, wherein the read-directory mechanism is part of the filesystem.

18. The apparatus of claim 17, wherein the read-directory mechanism comprises:
    a determination mechanism configured to determine if the entity representing the device coupled to the computer system is present in the portion of the file system hierarchy; and
    a creation mechanism configured to create the entity in the portion of the filesystem hierarchy if the entity representing the device coupled to the computer system is not present.

19. The apparatus of claim 17:
    wherein the receiving mechanism is further configured to receive a lookup operation at an operating system running on the computer system, wherein the lookup operation includes an entity name as an argument, and wherein the entity name is associated with a second device which is coupled to the computer system; and
    wherein the apparatus further comprises a lookup mechanism configured to perform the lookup operation on the portion of the filesystem hierarchy with the entity name to obtain information associated with the second device.

20. The apparatus of claim 19, wherein the lookup mechanism comprises:
    a determination mechanism configured to determine if the entity associated with the entity name is present in the portion of the filesystem hierarchy; and
    a creation mechanism configured to create the entity in the portion of the filesystem hierarchy if the entity representing the device coupled to the computer system is not present.

* * * * *

UNITED STATES PATENT AND TRADEMARK OFFICE
CERTIFICATE OF CORRECTION

| | |
|---|---|
| PATENT NO. | : 7,711,946 B2 |
| APPLICATION NO. | : 11/500804 |
| DATED | : May 4, 2010 |
| INVENTOR(S) | : Jerry A. Gilliam et al. |

It is certified that error appears in the above-identified patent and that said Letters Patent is hereby corrected as shown below:

In column 5, line 5, delete "directorv" and insert -- directory --, therefor.

In column 10, line 35, in claim 18, delete "file system" and insert -- filesystem --, therefor.

Signed and Sealed this
Fifth Day of April, 2011

David J. Kappos
*Director of the United States Patent and Trademark Office*